July 4, 1939.    F. R. HAHN    2,164,322
BUILDING CONSTRUCTION AND BUILDING ELEMENT
Filed Aug. 17, 1935    3 Sheets-Sheet 1
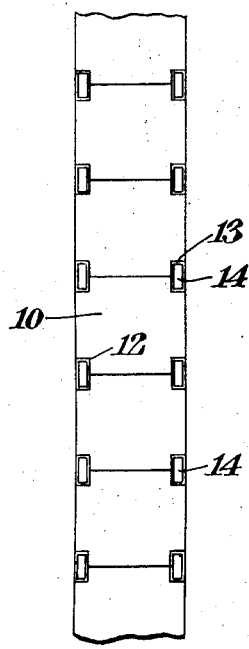
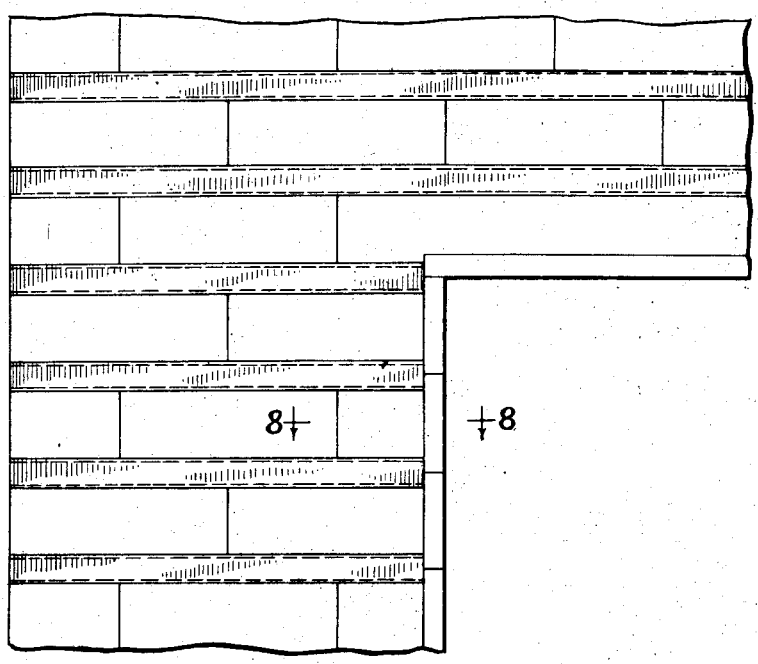
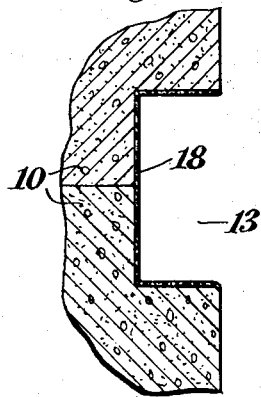
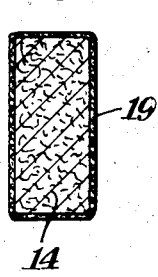
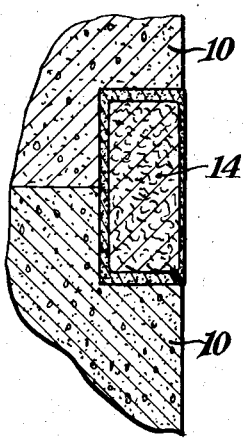
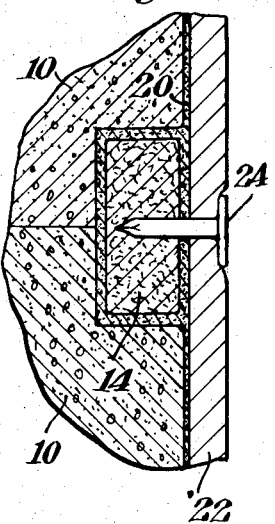
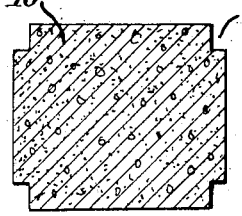
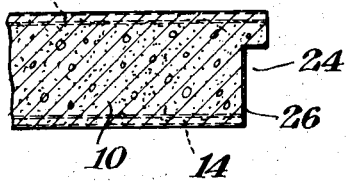
INVENTOR
Frank R. Hahn
BY
Prindle, Bean & Mann
ATTORNEY July 4, 1939.  F. R. HAHN  2,164,322
BUILDING CONSTRUCTION AND BUILDING ELEMENT
Filed Aug. 17, 1935    3 Sheets-Sheet 2
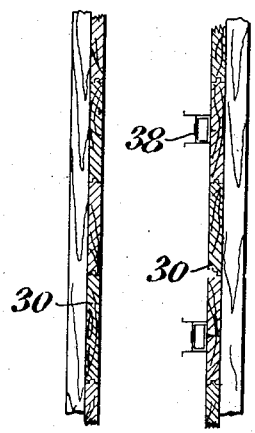
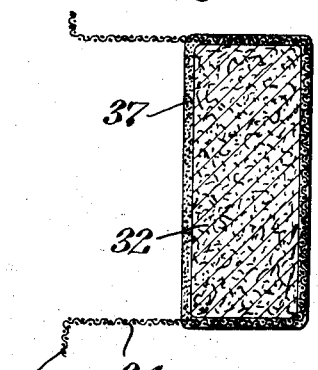
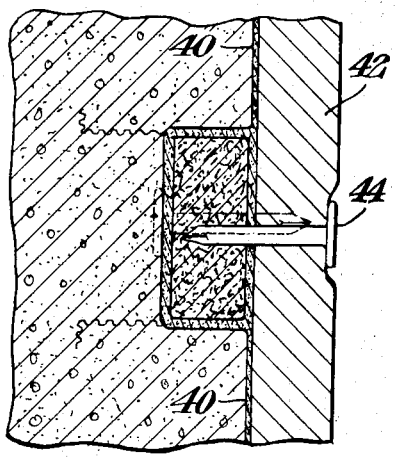
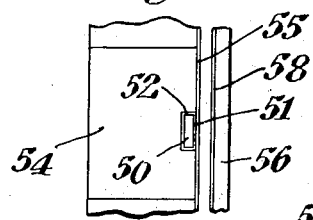
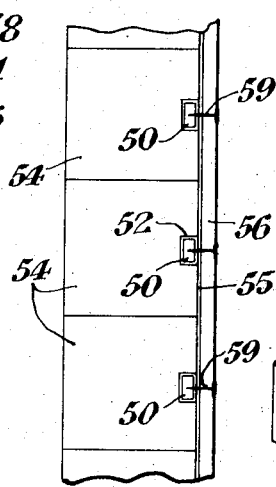
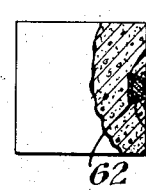
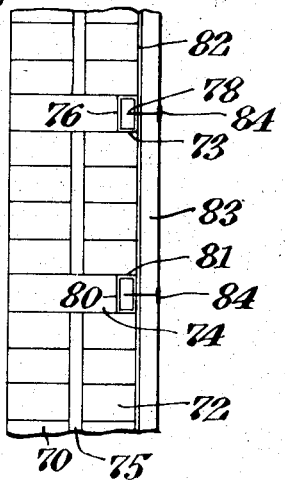
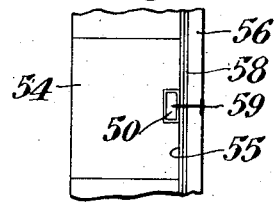
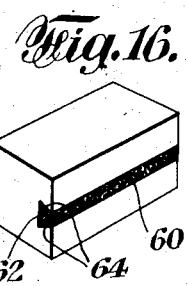
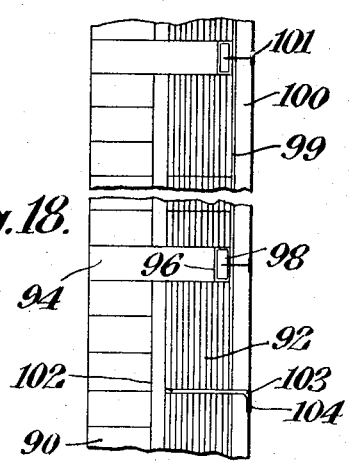
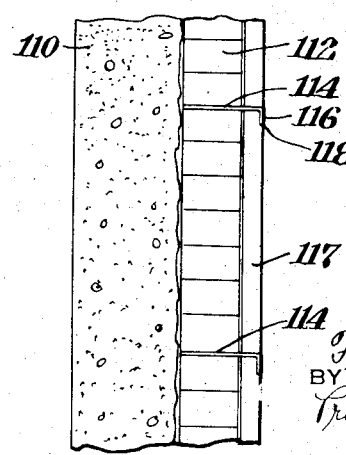
INVENTOR
Frank R. Hahn
BY Prindle, Bean & Mann
ATTORNEY July 4, 1939.  F. R. HAHN  2,164,322
BUILDING CONSTRUCTION AND BUILDING ELEMENT
Filed Aug. 17, 1935  3 Sheets-Sheet 3
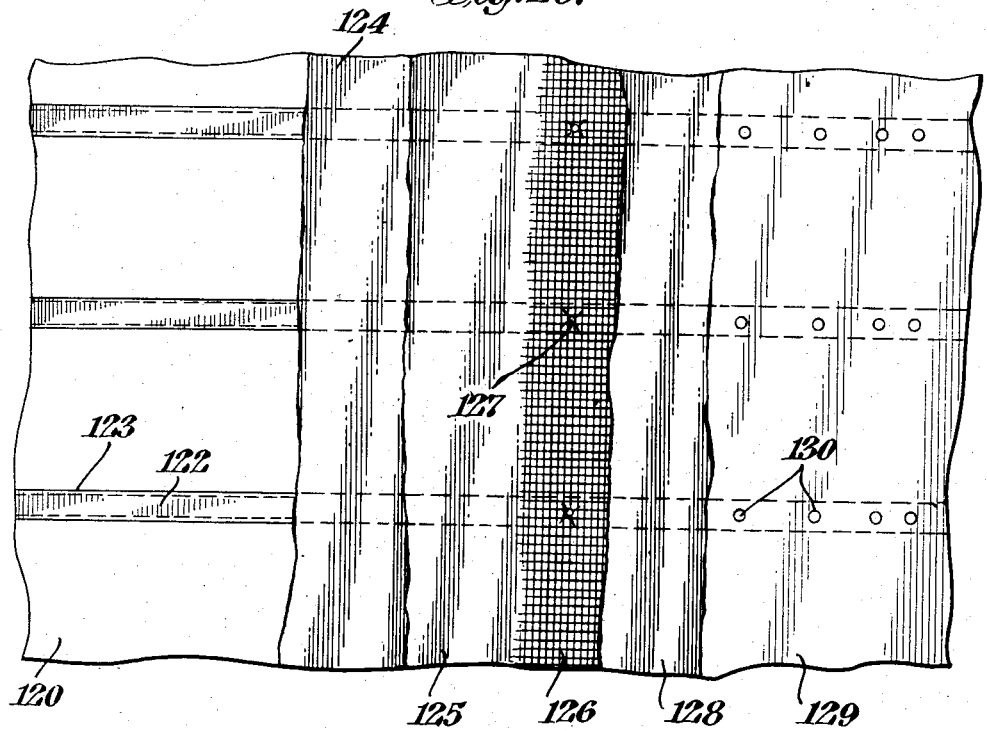
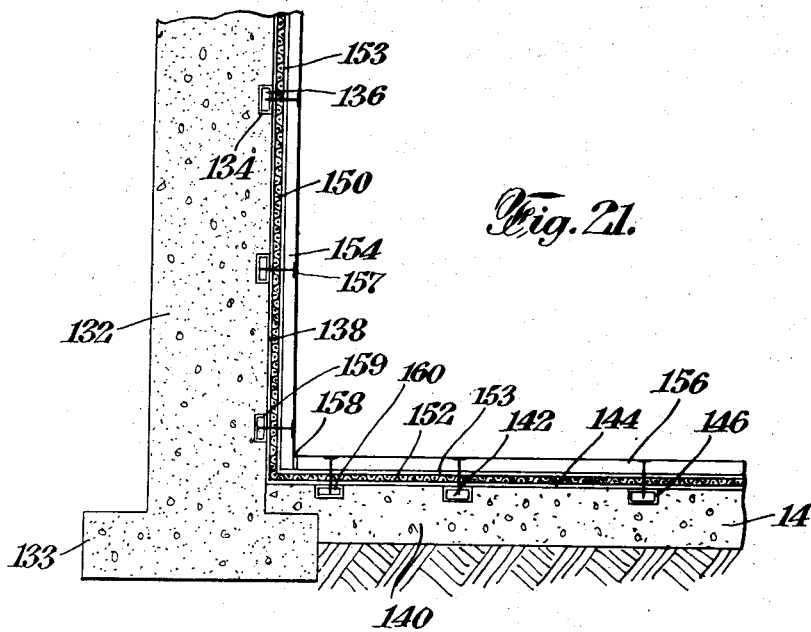
INVENTOR
Frank R. Hahn
BY
Prindle, Bean & Mann
ATTORNEY Patented July 4, 1939

2,164,322

UNITED STATES PATENT OFFICE 2,164,322

BUILDING CONSTRUCTION AND BUILDING ELEMENT

Frank R. Hahn, Decatur, Ill.

Application August 17, 1935, Serial No. 36,669

8 Claims. (Cl. 72—16)

This invention relates to improvements in constructions and methods of making the same.

It is well known that dampness in concrete buildings and in dwellings is one of the biggest drawbacks to this class of construction. I have invented new building constructions and also methods of constructing buildings and the like, whereby moisture and dampness are kept out of the building constructions.

One object of my invention is the provision of new methods of constructing buildings to make them waterproof and also the provision of waterproof constructions and building elements to be used therein.

I have shown various forms which my invention may take but I am not to be restricted to these forms as they may be varied without departing from the spirit of my invention.

In the drawings:

Fig. 1 represents an end elevation of a wall embodying one form of my invention;

Fig. 2 represents a side elevation of a wall including the nailing strips in position;

Fig. 3 represents an enlarged section showing the groove or cavity formed by the cut-away portions of the blocks of the wall, the groove or cavity being adapted to receive a fibrous nailing strip;

Fig. 4 represents a section through a coated or treated fibrous nailing strip;

Fig. 5 represents an enlarged vertical section showing the nailing strip in position in the cavity formed by the blocks;

Fig. 6 represents a vertical section with a coating of plastic material applied to the face of the blocks and the nailing strip and also a sheet of insulation material nailed to the strip;

Fig. 7 represents a vertical enlarged cross section of a block of the form shown in Figs. 1 to 6 inclusive;

Fig. 8 represents a horizontal section taken substantially on line 8—8 of Fig. 2 to show a window or door block;

Fig. 9 represents a mold for making monolithic concrete walls, the mold having treated fibrous nailing strips attached thereto;

Fig. 10 represents an enlarged section of the nailing strip shown in Fig. 9;

Fig. 11 represents a portion of a monolithic wall with the nailing strip imbedded therein and a sheet of insulating material nailed to the wall;

Fig. 12 represents an elevation of a portion of a different form of block having a nailing strip in one face of the block intermediate its ends, and a sheet of treated insulating material spaced therefrom;

Fig. 13 represents an elevation of the sheet of insulation material and the block shown in Fig. 12 in assembled relation with plastic material between the insulation material and the block;

Fig. 14 represents a portion of a wall made of blocks having nailing strips in the side faces thereof and a sheet of insulation material attached to the inner surface of the blocks;

Fig. 15 represents an end elevation of a different form of a block having another form of impregnated or coated nailing strip in one face thereof, parts being broken away to facilitate the disclosure;

Fig. 16 represents a perspective view on a reduced scale of the block shown in Fig. 15;

Fig. 17 represents an end elevation of a wall made of bricks which are so laid as to provide grooves or cavities for receiving nailing strips;

Fig. 18 represents an end elevation of a combination brick and tile wall, the bricks and tiles being so laid as to provide grooves or cavities for receiving nailing strips;

Fig. 19 represents an end elevation of a portion of a brick wall laid adjacent a concrete wall, the brick wall being provided with an insulation sheet held in position by adhesive and mechanical means;

Fig. 20 represents an elevation with parts broken away to show the manner of building up one form of wall structure; and, Fig. 21 represents a vertical sectional view of a water proofed wall and floor of a basement.

Referring now to the drawings, the reference character 10 designates a building block having its corners cut away at 12. When the blocks are assembled into a wall as shown in Fig. 1 the cut away corners 12 cooperate to produce grooves or elongated cavities 13 for receiving the nailing strips 14. These nailing strips are preferably fibrous and cellular and, preferably made of compressible composition material so that they will not swell and damage the wall as wooden strips would do in the event they absorbed moisture. By using these strips I provide nail receiving means whereby nails or other fastening means may be driven through sheets of composition material to secure such sheets to concrete walls.

The nailing strips may be of different materials for different purposes and uses but all such materials are similar and operate under the same principle. Nailing strips of different densities may be used for different positions. In one form these inserting or nailing strips comprise a mixture of asphalt, sand, and asbestos or the like. These strips are dense in body and will hold nails almost as well as wooden strips of the same size and are especially adapted for use where heavy objects have to be supported on walls or the like. Another form of strip comprises material made from wood or plant fibres impregnated with asphalt to a point where all cells are substantially filled so that the finished strip is solid but reasonably elastic and bendable. A strip made in this way will hold nails satisfactorily, especially for plastering and interior trim for buildings. Another form of material, which may be used in the manufacture of my window or door block shown in Fig. 8, comprises material of the same type as just described in connection with the preceding form, but in this case the exterior of the strip is only covered or coated to a point so as to protect the article from dampness as well as from decay and deterioration of the walls of the fibres. A strip made in this way is soft and resilient and may be used for cushioning or packing purposes.

In this form of the invention the wall is partly or completely built before the fibrous strips 14 are inserted into the cavities 13. Before the fibrous strips are inserted in the grooves or cavities 13 it is desirable to brush or coat the wall of the cavities as at 18 with an asphaltic paint or composition and also to impregnate or saturate the fibrous strip with asphaltic material as at 19. The coating or impregnating asphaltic composition used to coat the cavities and the strips is the same. The asphalt paint or asphaltic material preferably comprises an asphalt base cut back or thinned with volatile solvents and the paint or coating material is preferably applied cold. The coating or impregnation of the nailing strip preserves the strip from deterioration in concrete and water, and also serves as an adhesive to hold the strip against the concrete. After this treatment of the cavities and the strips, the coated or impregnated nailing strip and cavities are left for a while so that the plastic substance will harden sufficiently to form a good bond when the strips are inserted and pressed into the cavities. After this interval the treated nailing strips are inserted into the grooves or cavities 13 as shown in Fig. 5 on an enlarged scale and as shown in Figs. 1 and 2 in the wall. The inserted strips lie directly over the mortar joint and so prevent the entry of moisture of dampness at these points.

After the nailing strip is in position, the entire wall surface is painted, covered or coated as at 20 with an asphalt paint or similar plastic material, care being taken that every crevice and depression in the wall is filled and covered up. In cases of rough material in the blocks or units it may be necessary or desirable to apply two coatings or coverings.

The next step is to apply an insulation material to the surface of the wall. This insulation material may be of any composition material such as Celotex, Insulite, or Beaver Board or the like. A sheet of insulating material 22 is pressed or placed against the treated wall while the coating composition 20 is still in a reasonably plastic condition and nails or other securing means 24 are driven through the insulating material and into the fibrous nailing strips 14 in the blocks 10 for holding the sheets of insulating material securely against the wall until the asphalt paint or composition has united and bonded with the insulating material. In this way an even and perfect bond is secured over the entire surface. Tests have shown that no moisture will penetrate walls treated in the above manner. Moisture will not travel any further than to the asphaltic composition. Decorative finishes may be applied directly to the insulation itself and furring, lathing and plastering one or two coats may be dispensed with. An efficient and low cost wall or building may be erected in this way. If greater adhesiveness is desired, the sheet of insulation material may also be coated or covered on one face with a layer or coating of asphalt paint or composition. After the treatment the coated or treated face of the insulation sheet is pressed against the treated wall as above set forth.

In the form shown in Figs. 1 to 6, the cavities are provided on the inside and outside of the wall. If desired, only one side of the wall may be provided with the cavities 13 so that the blocks 10 will only have the corners on one side cut out. The size of the cavities and the size and thickness of the fibrous strips may be varied as desired. The building blocks may take any form. For basement floor constructions I may use strips made of a composition such as is used in expansion joints for roadways. Instead of having the nailing strip positioned between adjacent blocks as shown in Figs. 1 and 2, I may insert the nailing strip intermediate the ends of a building block as in Fig. 12. Also the groove or cavity which is to receive the nailing strip may take other forms than rectangular and may be provided with tapering or bevelled sides as shown in Fig. 15. These other forms will be discussed more fully later.

In Fig. 8 I have shown a section of a window or door block provided with a cut away portion 24 which is intended for receiving window or door frames to exclude cold drafts which can not be kept out where steel or wood window and door frames abut directly against the concrete. Small irregularities in the concrete are taken up by the insulating material 26 in my construction. The cut away portion 24 is provided with the insulation material 26 to provide a snug fit for the window or door frame.

The foundation of the building may be constructed of block construction but for the purpose of excluding water in a foundation, a wall of monolithic construction without seams or joints is more desirable. In cases where water pressure is abnormal or large, I place a metal netting or wire mesh over the nailing strip, as shown in Fig. 10, and the ends of the netting or wire mesh are imbedded in the concrete to give additional bonding as shown in Fig. 11. This is for the purpose of holding the securing or nailing strips in position and to prevent water pressure from dislodging them. This metal or wire mesh is usually not used above ground but should be used where there is water under pressure. As additional securing means or in place of the metal netting, nails or screws may be driven through the sides of the strips and the extending ends of the nails or screws lodged or imbedded in the concrete so that the strips will not be dislodged or pulled out under ordinary strain.

The construction of the monolithic wall above mentioned will now be discussed and attention is directed to Figs. 9, 10 and 11 including spaced wooden molds 30. One of these molds has attached thereto nailing strips 32 which are surrounded on three sides by the wire netting 34. The wire netting extends beyond the nailing strip and is bent back as at 36 at its free ends. The nailing strip is coated or impregnated with an asphalt paint or similar plastic material 37. The strip so formed and treated is nailed to the mold part by means of the nail 38 shown in Fig. 9. The concrete material is then poured between the mold parts 30 and after the concrete is set the molds are taken away leaving the nailing strip and screen or wire netting imbedded in the concrete material as shown in Fig. 11. The ends 36 of the wire netting act as bonding or anchoring means for the strips 32. After the wall is cleared of the forms or molds and protruding wires and any ridges are removed, a coating or layer 40 of plastic paint or asphaltic paint is applied over the inner surface of the concrete wall. In cases of rough material or surfaces it may be desirable to apply two coatings or layers of asphaltic paint or the like. The sheet of insulation material 42 may also be coated or painted on its inner face with an asphalt paint or the like and then pressed agaisnt the painted or coated surface of the concrete wall so that the two coating mediums will securely bind or bond together. To firmly hold the insulation material 42 in place against the wall, nails or the like 44 are driven through the insulation material and into the nailing strips. Thereafter the asphaltic coatings harden and a complete waterproof wall is obtained. Where a stronger construction is desired a sheet of wire cloth, metal netting or wire mesh is nailed over the surface of the asphaltic or plastic coating on the wall before applying the sheet of insulating material. This wire means keeps the sheet of asphalt intact and unbroken should cracks develop in the foundation walls.

In Figs. 12, 13 and 14 I have shown another form of my invention in which each nailing strip 50 is positioned in one face of the block but intermediate the edges of the block. Where the strip is positioned in the center of the face of the block, the strip is protected and this assembly prevents damage to the strip during transportation and handling as might happen if the strips were placed at the edges of the block. In this form each nailing strip 50 is painted or coated with asphalt paint or the like 51 and also the groove or cavity 52 in the block 54 for receiving the nailing strip is also painted or coated before the nailing strip is inserted. The treated or coated strip 50 is inserted in the coated groove or cavity 52 and the wall surface is painted or coated with asphaltic paint or similar plastic material 55. The sheet of insulation material 56 may also be painted or coated with asphaltic material as at 58 and is then pressed against the treated wall surface and against the nailing strips. To hold the insulation material in position nails or other securing means 59 may be used similar to the way described in Figs. 6 and 11. The coating 58 on the insulation sheet 56 may be omitted, if desired.

Instead of making the nailing strips of rectangular cross section, I may make the strip in the form shown in Figs. 15 and 16 in which the strip 60 has the bevelled or tapered sides 61. In this case the groove or cavity 62 which receives the nailing strip is also formed with tapered or bevelled sides 64. The nailing strip 60 is preferably cast or molded in the block during the process of making the block. When the strip 60 is cast or molded in the block, the strip is saturated or coated with asphaltic paint or composition before the block is molded so that a block having an imbedded waterproofed strip is made. The nailing strip 60 with the tapering or bevelled sides is one of the preferred forms of my invention in that in this form the nailing strip is securely held within the block and cannot be dislodged or pulled out of the wall construction. The coating of asphalt is continuous and is shown in Fig. 15 and also in Fig. 16. Of course, I can make the nailing strips shown in the other forms of my invention of a similar shape.

When it is desired to use the damp proofing method on brick walls I proceed as follows. In Fig. 17 is shown a damp proof brick wall comprising two layers or courses of bricks 70 and 72. The one course 72 is laid first and when brought to a certain height, the other course 70 is brought up. A sufficient space 75 should be left between the courses for play to get the outer wall smooth at the face. Now at certain intervals a course of brick is recessed, as often as desired, to form a continuous horizontal slot or cavity 73. To obtain this cavity the bricks are laid at right angles to the two columns of bricks as at 74. Naturally this will be done on the inner course of brick no matter how thick the wall may be. This slot or cavity 73 will be of a sufficient depth to accommodate a nailing strip of insulating material 78, as mentioned heretofore. After the wall is partially or completely built a coating of asphalt 80 is sprayed or applied to the surfaces of this slot or cavity 73. When the solvents have partially evaporated, the nailing strip 78 is saturated or coated with an asphalt paint or material as at 81 and is then placed in the cavity or groove 73 and set securely in place by using an elongated board and placing same over the insulating nailing strip, tapping it in place with a hammer. The brick wall surface of the finished wall is then painted or coated with asphaltic material as at 82. The insulation material 83 may also be coated or painted on one face with asphaltic material and this treated face is pressed against the painted or coated brick wall. If the sheet of insulation 83 is not coated one face thereof is pressed against the coated face of the wall over the nailing strips. Then nails or the like 84 are driven through the insulation material 83 and into the nailing strips 78. It is to be understood that a wall so prepared need not be finished at once but all that is required is to provide the cavities or recesses.

Fig. 18 represents a wall made in part from brick and hollow tile. One column similar to that shown in Fig. 17 is a brick column 90 and the inner column is formed from hollow tile 92. At intervals the bricks as at 94 are turned at right angles to the brick column 90 so as to space the hollow tile 92. The hollow tile are so arranged as to form spaces or cavities 96 adjacent the ends of the inturned bricks 94 which are adapted to receive nailing strips 98. The cavities 96 and the nailing strips 98 are treated with asphaltic material as described in connection wtih the other forms of my invention and then the inner wall surface of the hollow tile is treated or coated with asphaltic material 99 and the insulation material 100 pressed against the wall and held in position by nails or the like 101 driven into the nailing strips. Adjacent the lower end of the wall structure a metal strip 102 with extending prongs 103 is inserted between the hollow tile. The insulation material 100 is driven onto the prongs 103 of the metal strip 102 and after the insulation material is in place the prongs are bent over as at 104 to hold the insulation material in position. In tile construction when smaller units are used, the method is substantially the same as above. But when large tile is employed for backing up, an occasional course of recessed brick will give the same results, or bricks used as header course will serve the purpose. Where a wall is laid up and conditions will not permit the forming of a cavity or recess, such as single walls laid up against a weak or crooked wall, I use a saw-toothed metal strip and lay it into the wall between the mortar and let the points or teeth extend beyond the surface sufficiently to engage and hold the sheet of insulation material securely to the wall while the asphaltic material is hardening.

In Fig. 19 the concrete wall 110 is shown and against the wall is built a column of bricks 112. Positioned at intervals between the bricks are the metal strips 114 provided with extending prongs 116. After the brick wall surface and the insulation material 117 are treated with asphaltic paint or the like, the insulation material is driven onto the prongs 116 of the metal strips and the prongs are bent over as at 118 to hold the insulation material in place. The insulation material need not be coated with asphaltic material before being driven onto the prongs. Also the prongs may be made shorter so as not to extend beyond the sheet of insulation material 117 and then the prongs will not have to be bent over.

In Fig. 20 I have shown a portion of a wall with parts broken away to illustrate one method of applying different layers on the wall. The reference character 120 represents a wall having nailing strips 122 held in grooves or cavities 123 therein. The nailing strips and the grooves within which they are received are treated with asphaltic paint or the like as hereinbefore described and then the nailing strips 122 are forced into the grooves. After the nailing strips are in position the entire wall surface is painted or coated with plastic or asphaltic material as at 124. In some instances it may be desirable to apply a second asphaltic or plastic coating 125. Where a foundation is being built or a strong wall is desired, a layer of screen material or wire or steel mesh 126 may be placed over the treated wall and secured by a few nails as at 127. After the screen is placed in position, another coating of asphaltic paint or the like 128 is applied to the screen 126 and the wall. The sheet of insulation material 129 may then be painted on one side with an asphalt paint or similar adhesive and waterproof material and the sheet of insulation material is placed against the coatings on the wall 120. Nails or the like 130 are then driven through the sheet of insulation material 129 and into the nailing strips 122 to hold the sheet of insulation material in position. The coating of adhesive or asphaltic material applied to the sheet of insulation material 129 may be omitted. Also the screen material 126 may be omitted, this screen material being necessary for basement walls and the like where water pressure is encountered.

Fig. 21 represents a wall and a floor of a basement which has been waterproofed according to my invention. The monolithic wall 132 has a footing 133 and is formed with spaced horizontal grooves or cavities 134 adapted to receive the nailing strips 136. The grooves or cavities 134 are painted or coated with asphaltic material and the nailing strip 136 is painted or coated with asphaltic material in the manner hereinbefore set forth. The nailing strip is then inserted into the grooves 134. As set forth above in the description of Figs. 9, 10 and 11, the strips may be painted or coated with waterproof material and molded into the concrete wall as a part thereof. Also different forms of strips may be used. The entire inner wall of the construction 132 is then painted with an asphaltic waterproofing material as at 138. The floor 140 is also provided with nailing strips 142 and a waterproof layer 144. The grooves or cavities 146 for the nailing strips may be formed during the molding of the floor 140 or else the nailing strips may be forced down into the concrete shortly after it is laid and while the concrete is soft and moldable. The side wall and the floor are then reinforced. A vertical layer of screen material 150 and a horizontal layer 152 are placed against the waterproofed side wall 132 and bottom wall or floor 140. The layers 150 and 152 may be made of one piece bent into shape. This wire means keeps the sheet or coating of asphalt intact and unbroken should cracks develop in the foundation or backing walls. After the screen material is in place another coating of waterproofing or plastic material is applied over the screen materials 150 and 152 as at 153. Finally the sheets of insulation material 154 and 156 are placed against the treated wall and floor. Before the sheets of insulation material are inserted in place it may be desirable to paint or coat the inner surface thereof with waterproofing or asphaltic paint as in the other forms of my invention. If the sheets of insulation 154 and 156 are coated before being applied, they are placed against the treated wall so that the two coating mediums will securely bind together with the wire mesh therebetween. When the sheets of material are in place, nails or the like 157 are driven through them and into the nailing strips 136 and 142 to hold the sheets firmly in position. A filler strip 158 of asphaltic composition may be used between sheets 154 and 156. In this form lower strip 159 will act as a nailing medium for base boards. Nailing strip 160 may be used to hold the edge of the floor material and prevent curling. If the insulation were placed directly on the floor without the strip securing means, the nature of the material would cause it to buckle in some places and no perfect or complete bond could be had. A floor constructed according to my invention will permit rugs to be laid upon it, or the various kinds of tile may be used. The same method can be used in upper floors, but the method of using wire mesh for guarding against water pressure may be eliminated.

If cinder blocks are used to build a wall and the cinder blocks are green and unseasoned, I dispense with the nailing strips for the reason that nails can be driven into such blocks. The wall made of these blocks is coated or covered with asphaltic material, care being taken to cover the rough surface of the block wall. The sheet of insulation material may also be coated with asphaltic material and then pressed against the coated wall. The system of waterproofing is substantially the same as described in connection with the other forms of my invention. If desired, a layer of wire mesh or netting may be used between the block wall and the sheet of insulation material as above set forth.

In case the earth is used as the outer wall in a foundation and the inner form is braced separately and no wire ties interfere, the insulation sheet is placed directly against the form and the asphaltic coating is applied on the insulation sheet. The wire or metal mesh is next applied and another coating or layer of asphaltic paint or material is applied over the wire or metal mesh. In order to hold this assembly securely against the form, I have the ends of the wire of metal mesh extend beyond the sides of the form, the bottom part being turned under the form at right angles and secured lightly by small nails driven into the form. After the concrete is poured and set and the form removed, there will be sufficient wire or metal mesh projecting into the basement to be imbedded in the concrete floor in the same way as the metal mesh is imbedded in the side walls. The top portion extending beyond the form may be turned over the wall and masonry placed thereon or it may extend into additional concrete above. The extending sides are for the purpose of overlapping at the joints to give additional strength and resistance at the connecting parts.

In the construction of roofs of concrete slabs, my insulating or nailing strips may also be employed. Using insulation directly against the ceiling eliminates condensation. In partition walls strips may be used on either side but it has been found that strips placed at the end in these walls will be satisfactory.

The nailing strips may be of the same length as the individual blocks or may be elongated and put in place in the cavities or grooves after the wall is partly or completely built. The strips may or may not be inserted into the blocks. If the strips are not molded or cast in the blocks, the blocks are stored without the strips.

Instead of composition nailing strips, it is to be understood that I may use wooden nailing strips provided the wooden strips are carefully impregnated or coated with an asphaltic composition so as to prevent the entry of moisture into the wooden strips.

In the form of my invention shown in Figs. 9, 10 and 11 where monolithic forms are used, it is to be understood that circular walls may be made in the same way. While it is preferred to have the inserting or nailing strips or mediums cast or molded in the wall, I may cast or mold the wall without using the inserting or nailing mediums and insert the nailing mediums after the wall is built. For furring, the inserting strips may project beyond the line of the wall.

My invention is also adapted for use on concrete houses where it is desirable to apply shingles or imitation brick siding.

From the foregoing it will be apparent that I have set forth various ways of waterproofing building constructions.

What I claim is:

1. A construction of the character described, including a wall provided with elongated cavities, asphaltic waterproof adhesive means in said cavities, and fibrous nailing strips held in said cavities by said waterproof adhesive means, said strips having a complete covering surface of asphaltic waterproof material.

2. A construction of the character described, including a wall provided with elongated spaced cavities, waterproof adhesive means in said cavities, and fibrous nailing strips, each strip having its surfaces completely covered with waterproof adhesive means, said strips being held in said cavities by said waterproof adhesive means.

3. A construction of the character described, including a wall provided with elongated spaced cavities, asphaltic waterproof adhesive means in said cavities, and fibrous nailing strips held in said cavities by said waterproof adhesive means, said cavities having tapered or bevelled sides and said nailing strips having tapered or bevelled sides to fit into said cavities and be securely held therein.

4. An article of the character described, adapted for use in building construction, comprising a block provided with an elongated cavity or groove in one face thereof, a fibrous strip positioned and held in said cavity or groove, said strip having its surfaces coated with asphaltic material.

5. An article of the character described, adapted for use in building constructions, comprising a composition block provided with an elongated cavity or groove in one face thereof, a fibrous nailing strip positioned and held in said cavity or groove, said strip having a protective covering of asphaltic material, said strip and groove or cavity having tapering sides for securely holding said strip in position in the block, the strip being cast or molded in the block during the manufacture of the block.

6. A construction of the character described, including a wall provided with elongated cavities, said cavities having a surface coating of adhesive asphaltic material, fibrous strips held in said cavities by said asphaltic material, a layer or coating of waterproof material applied to one surface of said wall and over said strips, a sheet of insulation material placed against the asphaltic material on the wall, and fastening means extending through said insulation material and into said strips for securely holding the insulation material in place against the wall.

7. A construction of the character described, including a wall provided with elongated cavities, said cavities being coated with adhesive asphaltic material, fibrous strips held in said cavities by said asphaltic material, a layer or coating of waterproof material on the surface of said wall, a sheet of insulation material placed against the waterproof material on said wall, and metal mesh or screening held between said sheet of insulation material and said wall.

8. A construction of the character described, including a wall provided on one face with imbedded fibrous strips securely held therein, a layer or coating of bituminous material on the surface of the wall, a sheet of fibrous material placed against the bituminous material on said wall, and fastening means extending through said fibrous sheet and into said fibrous strips to hold said sheet against the wall and bond it with said bituminous material.

FRANK R. HAHN.